(12) United States Patent
Muck et al.

(10) Patent No.: US 7,484,786 B2
(45) Date of Patent: Feb. 3, 2009

(54) ADJUSTABLE REAR SEAT

(75) Inventors: Todd Rupert Muck, Fowlerville, MI (US); Masroor Fahim, Canton, MI (US); Bill Deming, Fenton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/555,481

(22) Filed: Nov. 1, 2006

(65) Prior Publication Data

US 2007/0252404 A1    Nov. 1, 2007

Related U.S. Application Data

(60) Provisional application No. 60/796,584, filed on May 1, 2006.

(51) Int. Cl.
*B60N 2/48*    (2006.01)
(52) U.S. Cl. .................... 296/65.09; 296/65.13
(58) Field of Classification Search .............. 296/65.01, 296/65.09, 65.13; 297/344.12, 344.13, 344.15, 297/325, 329, 340, 641, 378.1
See application file for complete search history.

(56) References Cited

U.S. PATENT DOCUMENTS

| | | | |
|---|---|---|---|
| 4,518,201 A | 5/1985 | Wahlmann et al. | |
| 4,657,297 A | 4/1987 | Ishibashi | |
| 4,805,953 A * | 2/1989 | Yamauchi | 296/65.09 |
| 4,880,268 A | 11/1989 | Brambilla | |
| 6,565,138 B2 | 5/2003 | Sparrer | |
| 6,883,854 B2 | 4/2005 | Daniel | |
| 6,964,452 B2 | 11/2005 | Kammerer | |
| 7,255,399 B2 * | 8/2007 | White et al. | 297/378.12 |
| 2005/0248199 A1 * | 11/2005 | Epaud | 297/378.1 |

FOREIGN PATENT DOCUMENTS

| | | |
|---|---|---|
| EP | 0211248 | 2/1987 |
| JP | 60244634 | 12/1985 |
| JP | 62238137 | 10/1987 |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A rear seat assembly for a truck includes a seat cushion and a seat back. The seat cushion supports an occupant above the floor of the vehicle. The seat cushion has opposite and spaced apart front and rear ends. The seat back supports the back of the occupant while seated on the seat cushion. The seat back is operatively coupled to the seat cushion to allow selective angular adjustment of the seat back relative to the seat cushion between a plurality of seating positions. The seat back is also movable between any one of the seating positions and a folded flat position overlying the seat cushion. The rear seat assembly is movable along the floor of the vehicle between a full rear position, where the rear end of the seat cushion is adjacent a rear wall, and a full forward position, where the front end of the seat cushion is spaced apart from the rear wall.

16 Claims, 6 Drawing Sheets

ADJUSTABLE REAR SEAT

CROSS REFERENCE TO RELATED APPLICATION

This application claims priority to U.S. provisional patent application No. 60/796,584, which was filed May 1, 2006 and is incorporated herein by reference in its entirety.

BACKGROUND OF THE INVENTION

1. Field of the Invention

The invention relates to seat assemblies for automotive vehicles. More particularly, the invention relates to a rear seat assembly having a seat cushion that is vertically displaceable in response to angular adjustment of a seat back.

2. Description of the Related Art

Pickup trucks and other sport utility-type trucks have grown in popularity over the past decade. In response, manufacturers are continuously designing trucks with enhanced functionality and features. Many of these enhancements are found in the truck interior, particularly the seating. Older pickup truck designs typically utilized simple bench type, nonadjustable rear seating, or otherwise rear seating with limited adjustment for both comfort and to accommodate cargo.

Thus, it remains desirable to provide a rear seat design for use in trucks, especially pickup trucks, which provides greater options for adjustment over conventional rear seat designs.

SUMMARY OF THE INVENTION

According to one embodiment of the invention, a rear seat assembly is provided for a truck having a passenger compartment, wherein the passenger compartment includes a floor and a rear wall. The rear seat assembly includes a seat back and a seat cushion. The seat back is pivotally adjustable between a generally upright seating position and a folded flat position. The seat cushion is movable vertically between a seating position spaced apart from the floor of the vehicle and a stowed position adjacent the floor of the vehicle. The seat cushion is movable between the seating position and the stowed position in response to movement of the seat back between the generally upright seating position and the folded flat position.

According to another aspect of the invention, a rear seat assembly is provided for a truck having a passenger compartment, wherein the passenger compartment includes a floor and a rear wall. The rear seat assembly includes a seat back, a seat cushion and an adjuster mechanism. The seat back is pivotally adjustable between a generally upright seating position and a folded flat position. The seat cushion is pivotally coupled to the seat back. The adjuster mechanism is operatively coupled between the seat back and seat cushion to cause generally vertical displacement of the seat cushion between a seating position spaced apart from the floor of the vehicle and a stowed position spaced below the seating position in response to adjustment of the seat back between the upright seating and folded flat positions. The adjuster mechanism includes an at least four-bar linkage, wherein the seat back forms a part of the at least four-bar linkage.

BRIEF DESCRIPTION OF THE DRAWINGS

Advantages of the present invention will be readily appreciated as the same becomes better understood by reference to the following detailed description when considered in connection with the accompanying drawing, wherein.

DETAILED DESCRIPTION OF THE INVENTION

The invention provides a rear seat assembly that improves over conventional rear seat designs by providing more options for adjustment of the rear seat assembly between use and stowed positions to maximize cargo space in the passenger compartment.

Figure 1:
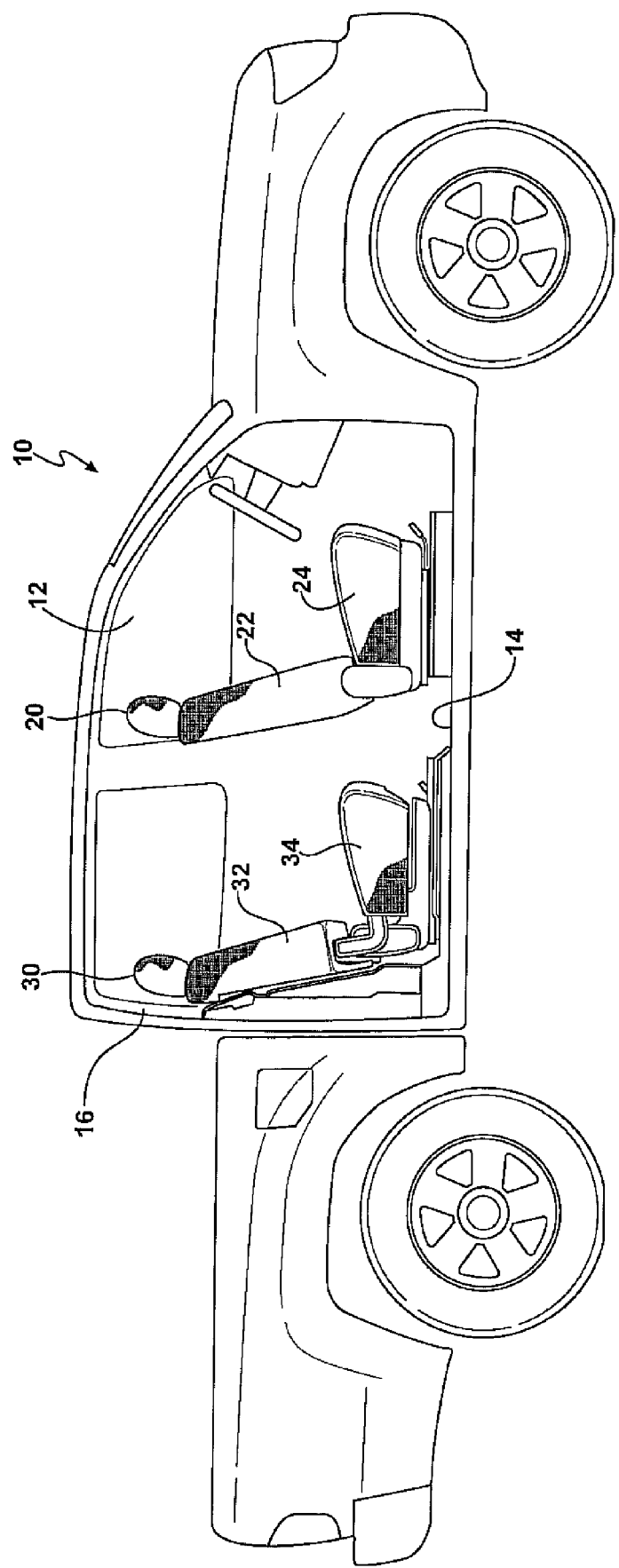
FIG. 1 is a side view of a truck according to one embodiment of the invention.

Referring to FIG. 1, a truck according to the invention is generally indicated at 10. The truck 10 includes a passenger compartment 12 having a front seat assembly 20 and a rear seat assembly 30 for supporting occupants above a floor 14. The front seat assembly 20 includes a seat back 22 and a seat cushion 24. The front seat 20 allows selective fore and aft adjustment of the seat cushion 24 along the floor 14 and angular adjustment of the seat back 22 relative to the seat cushion 24 between a plurality of reclined seating positions.

Figure 2:
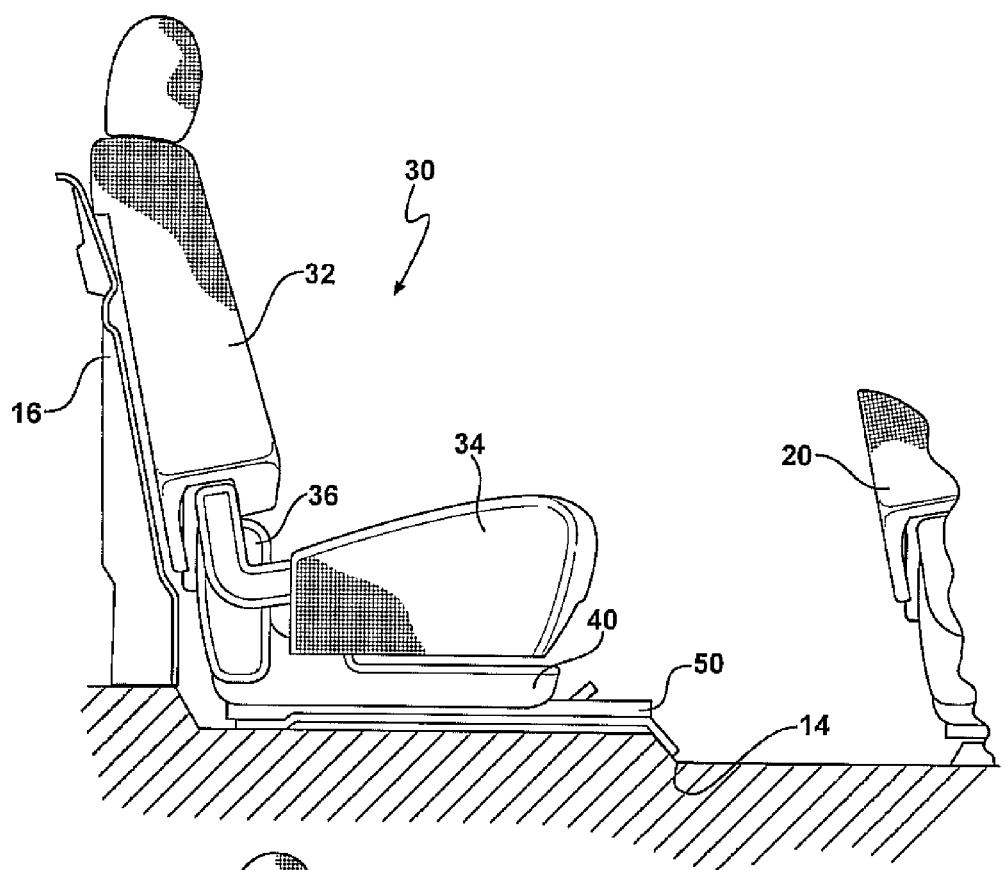
FIG. 2 is an enlarged side view of the truck with a rear seat assembly according to the invention shown in a full rear position.
Figure 3:
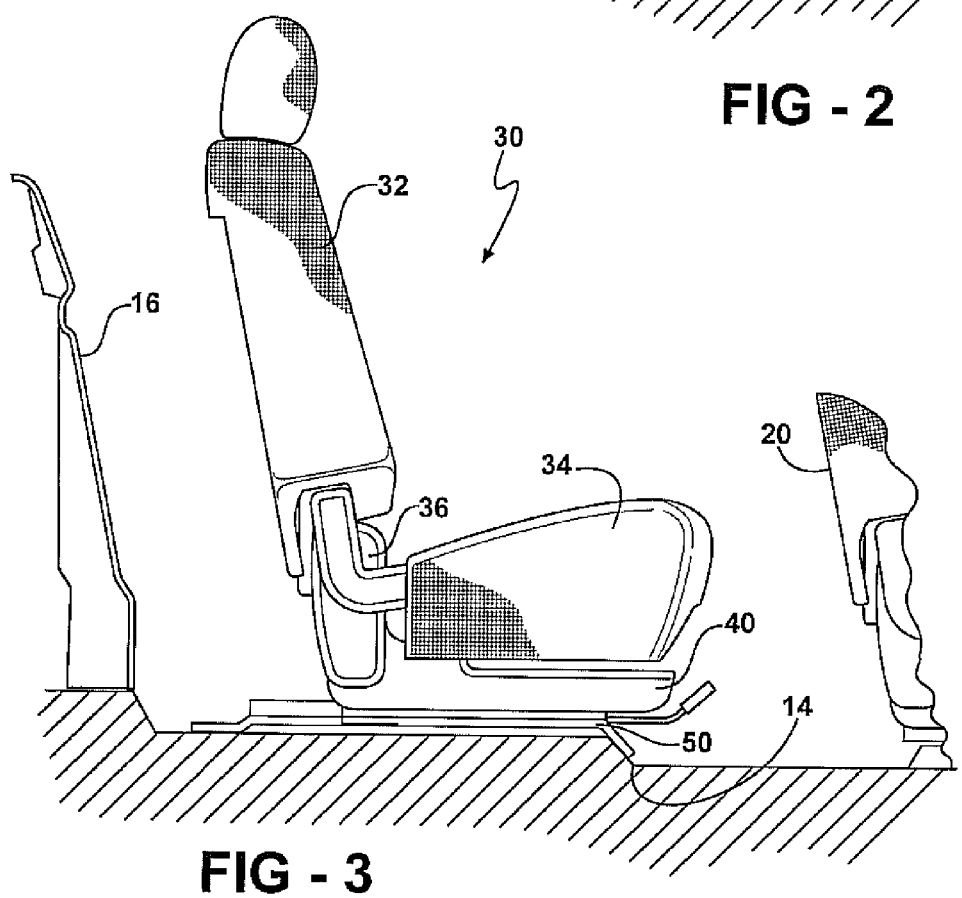
FIG. 3 is an enlarged side view of the truck showing the rear seat assembly in a full forward position with the seat back in an upright position.
Figure 4:
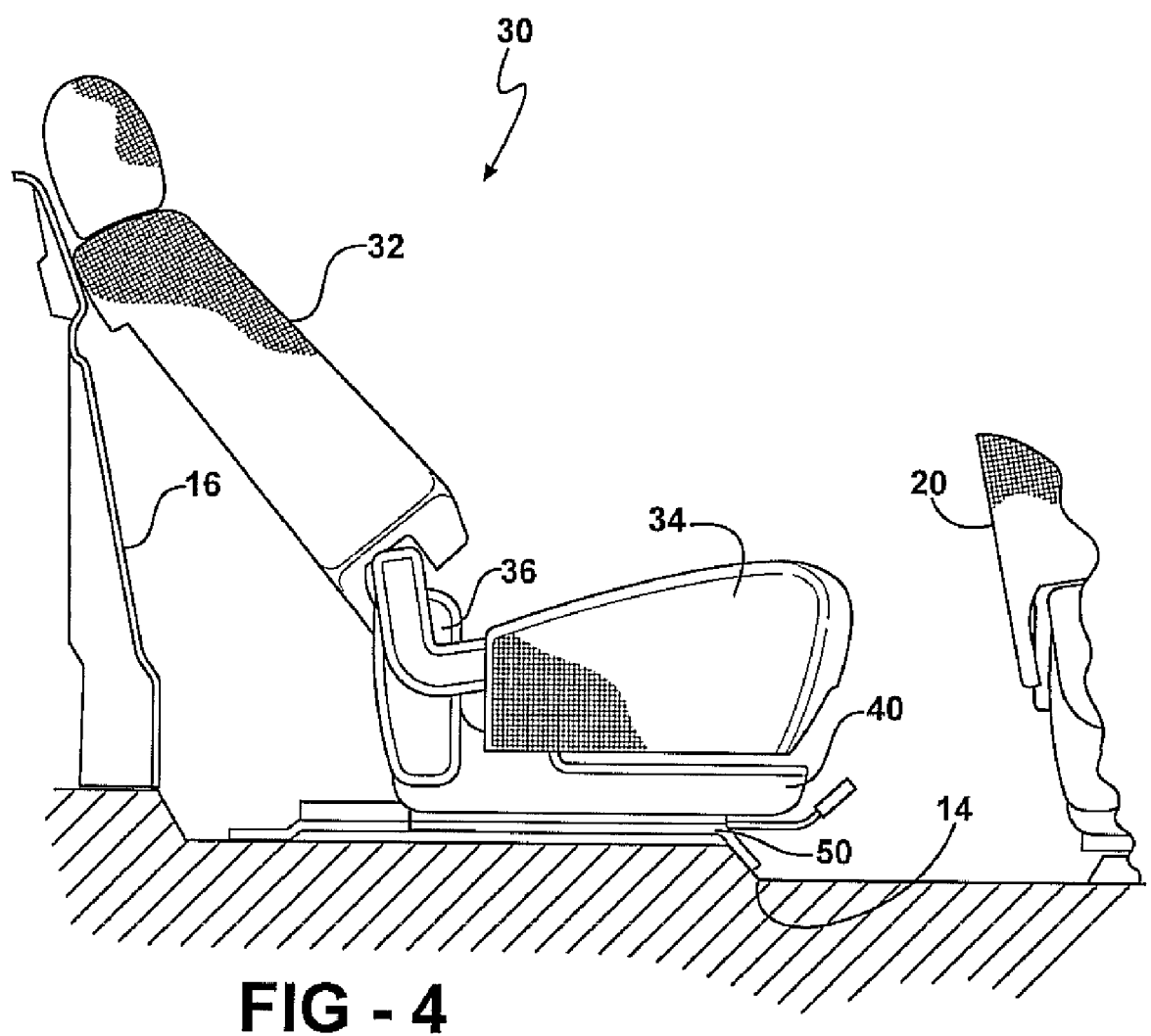
FIG. 4 is an enlarged side view of the truck showing the rear seat assembly in the full forward position with the seat back in a fully reclined seating position.
Figure 5:
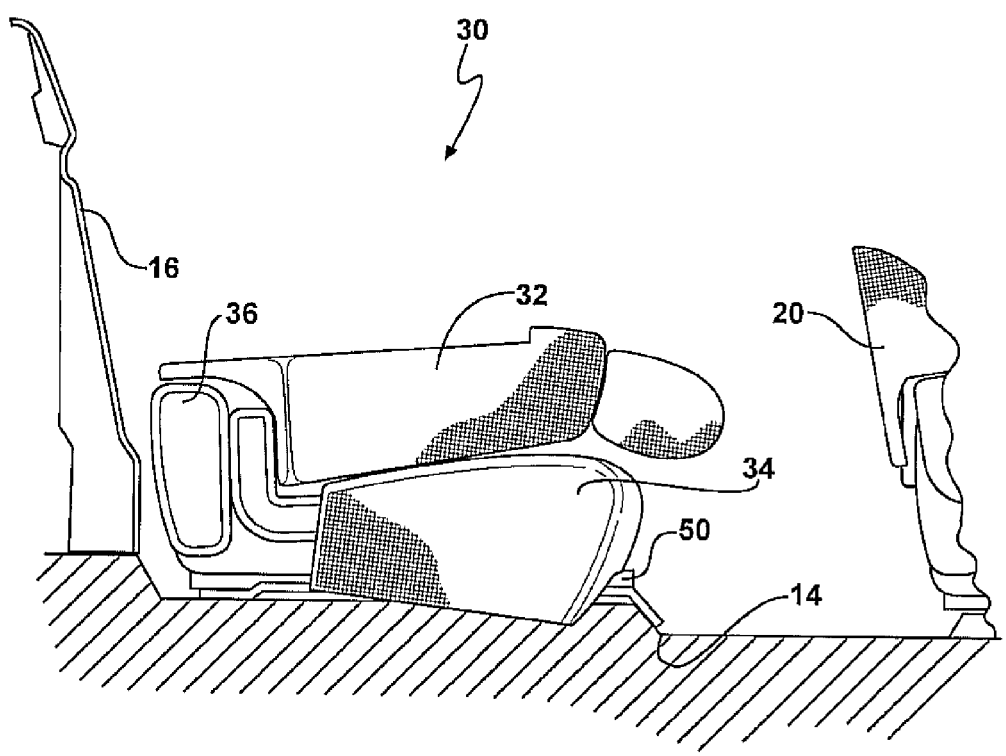
FIG. 5 is an enlarged side view of the truck showing the rear seat assembly in a full rear position with the seat back in the folded flat position.
Figure 6:
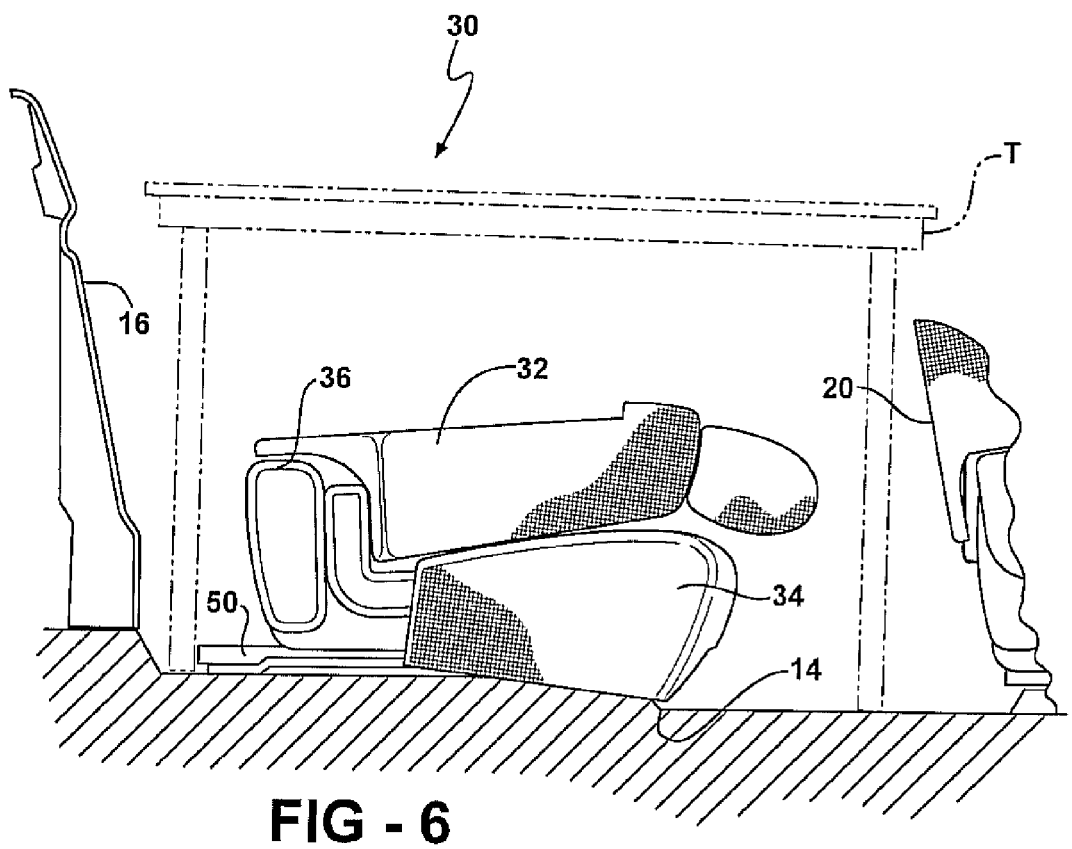
FIG. 6 is an enlarged side view of the truck showing the rear seat assembly in a middle position with the seat back in the folded flat position.
Figure 7:
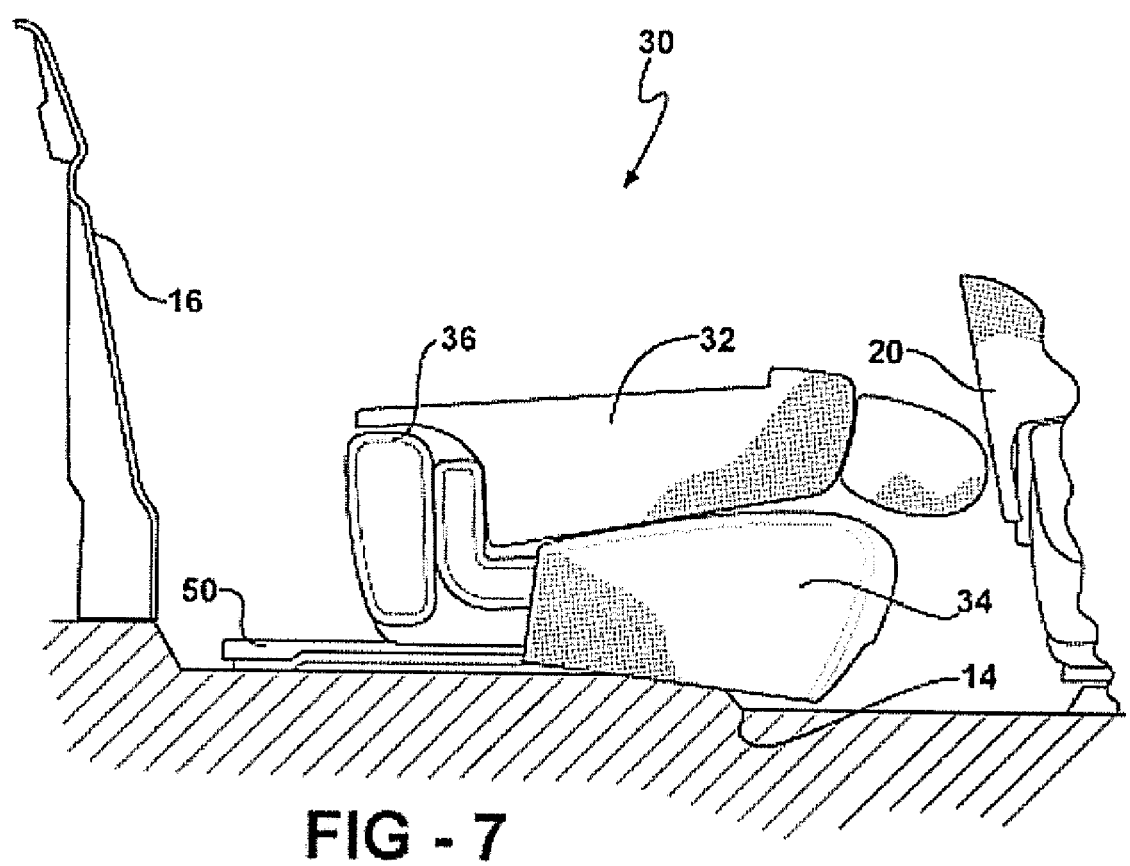
FIG. 7 is an enlarged side view of the truck showing the rear seat assembly in the full forward position with the seat back in the folded flat position.
Figure 8:
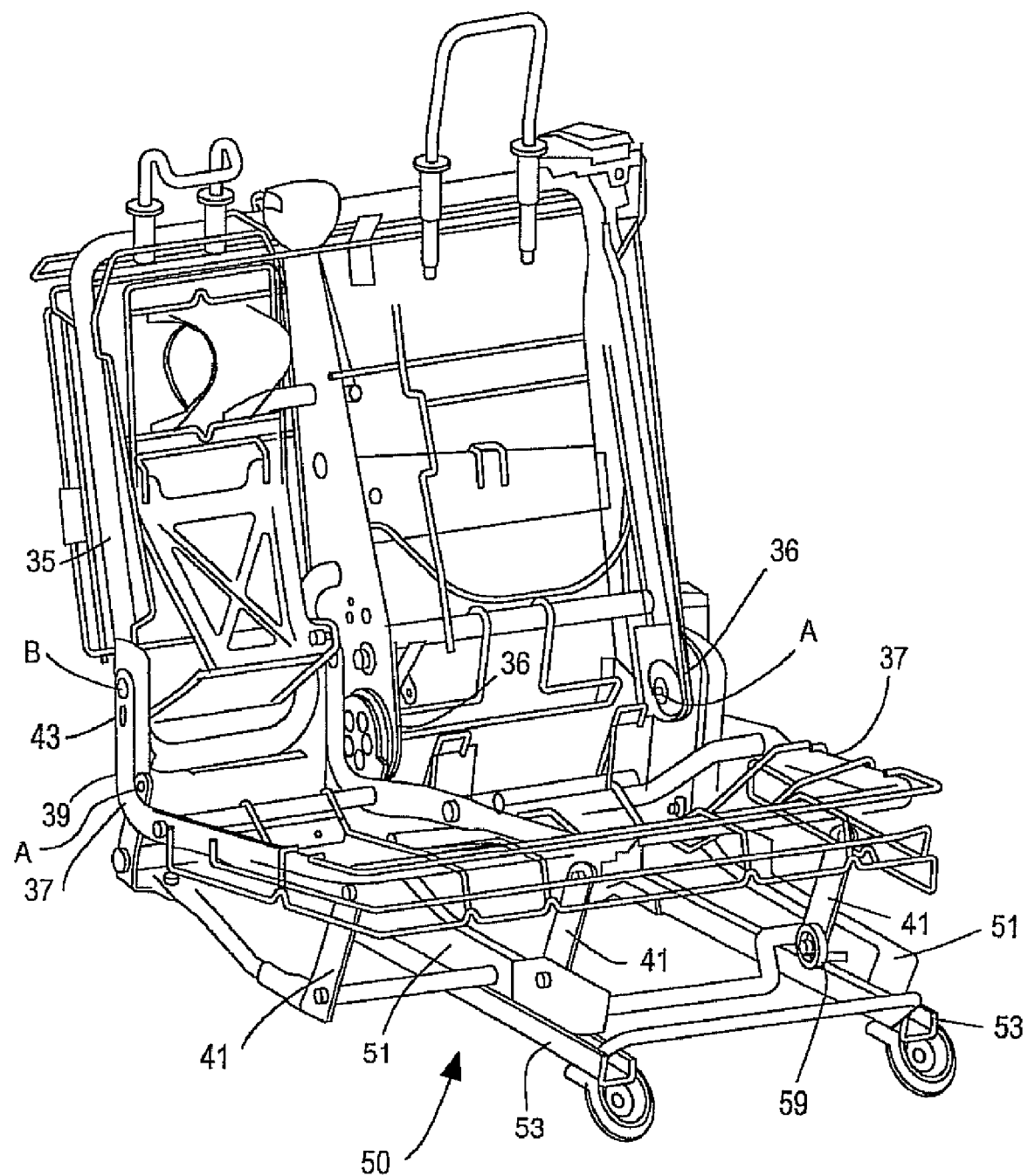
FIG. 8 is a perspective view of a seat frame of the rear seat assembly shown in the upright position.

Referring to FIGS. 2-8, the rear seat assembly 30 includes a seat back 32 and a seat cushion 34, The seat back 32 includes a back frame 35 that supports a foam pad covered by a textile, vinyl and/or leather trim cover. Similarly, the seat cushion 34 includes a cushion frame 37 that supports a foam pad covered by a trim cover. A bottom end of the back frame 35 is coupled to a floor-mounted track mechanism 50 by a recliner mechanism 36. The recliner mechanism 36 allows selective angular adjustment of the seat back 32 relative to the seat cushion 34 about a first pivot axis A between a generally upright seating position, as shown in FIG. 3, a reclined seating position, as shown in FIG. 4, and a plurality of seating positions therebetween. The recliner mechanism 36 is continuously biased toward a locked position to maintain the angular position of the seat back 32 relative to the seat cushion 34. The recliner mechanism 36 also allows the seat back 32 to be moved to a forwardly folded flat position overlying the seat cushion 34, as shown in FIGS. 5-7.

The track mechanism 50 includes a lower track 53 and an upper track 51. The lower track 53 is fixedly secured to the floor 14. The upper track 51 is coupled to the seat cushion 34 by an adjuster mechanism 40. The upper track 51 is also slidably coupled to the lower track 53 to allow selective fore and aft adjustment of both the seat back 32 and cushion 34 together between a frill rear position, as shown in FIGS. 2 and 5, and a full forward position, as shown in FIGS. 3-4 and 7.

The track mechanism 50 also includes a latch mechanism that allows the upper track 51 to be selectively locked or constrained relative to the lower track 53. The latch mechanism is continuously biased toward a locked state.

The adjuster mechanism 40 utilizes an at least four-bar linkage for displacing the seat cushion 34 upwardly and downwardly in response to angular adjustment of the seat back 32 relative to the seat cushion 34 between the upright seating position, as shown in FIGS. 2 and 3, and the folded flat position, as shown in FIGS. 5-6. The seat cushion 34 is also displaced forwardly and rearwardly during the downward and upward movement, respectively.

The adjuster mechanism 40 includes an at least four-bar linkage defined by front links 41 and rear links 43. Each front link 41 extends between a lower end pivotally coupled to the upper track 51 of the track mechanism 50 and an upper end pivotally coupled to the bottom of the cushion frame 37. Each rear link 43 is provided in the form of a bracket that is fixedly secured to a bottom end of the back frame 35. Optionally, the rear link is formed integrally with the back frame, so that the back frame forms a part of the four bar linkage. A rear end 39 of the cushion frame 37 is bent upwardly and is pivotally coupled to an upper end of the rear link 43 by a second pivot pin B. A bottom end of the rear link 43 is pivotally coupled to the upper track 51 for pivotal movement about the first pivot pin A. A biasing member 59 is continuously energized between the upper track 51 and the front link 41 for biasing the seat back 32 and cushion 34 toward a seating position or away from the stowed position. By this arrangement, the seat cushion 34 moves downwardly and forwardly to accommodate the seat back 32 as it moves to the folded position and to provide greater cargo area above the folded seat back 32 over conventional designs.

In use, a user sitting on the rear seat 30 may adjust the fore and aft position of the entire seat 30 by unlocking the latch mechanism of the track mechanism 50 and sliding the rear seat 30 along the lower track of the track mechanism 50. Once a desired fore and aft position is reached, the latch mechanism is allowed to return to the locked position to maintain the rear seat 30 in the desired position.

The user may adjust the seat back 32 relative to the seat cushion 34 by operating the recliner mechanism 36. While the user is seated on the rear seat 30, the seat back 32 may be adjusted between the generally upright seating position, as shown in FIG. 3, the reclined seating position, as shown in FIG. 4, and any of the plurality of seating positions therebetween. It should be readily appreciated that the rear seat 30 may need to be moved forwardly to accommodate adjustment of the seat back 32 to the reclined seating positions, depending on the packaging space available in the particular vehicle application. As shown in FIG. 2, the rear seat 30 is in a full rear position, where the seat back 32 is in the upright position and is adjacent to a rear wall 16 in the passenger compartment. Thus, from the full rear position, the rear seat 30 must be moved forwardly along the floor 14 to accommodate the adjustment of the seat back 32 to the reclined position in FIG. 4. The rear seat 30 may be moved to a full forward position allowing angular adjustment of the seat back 32 to a fully reclined position, as shown in FIG. 4, which is generally defined by contact between the rear wall 16 of the passenger compartment 12 and the seat back 32. In the full forward position, the seat back 32 has at least 32 degrees of adjustment between the fully reclined and upright positions, which significantly improves over conventional truck rear seat designs offering limited or no angular adjustment of the seat back With the user off of the rear seat 30, the seat back 32 may be moved between any of the seating positions and the forwardly folded position, as shown in FIG. 5. In the folded flat position, the back of the seat back 32 may serve as a substantially horizontal cargo loading floor. The seat cushion 34 is displaced downwardly as the seat back 32 is moved to the folded flat position. This allows for a lower cargo loading floor over conventional designs, which have only a fixed seat cushion that remains vertically in the same position as the seat back is moved to the folded flat position.

While the seat back 32 is in the folded position, the rear seat 30 may be adjusted fore and aft along the floor 14 of the vehicle. The cargo space in front of the rear seat 30 is maximized with the rear seat 30 in the full rear position, as shown in FIG. 5. Similarly, the cargo space behind the rear seat 30 is maximized with the rear seat 30 in the full forward position, as shown in FIG. 7. The rear seat 30 may also be moved to a middle position between the full rear and full forward positions, as shown in FIG. 6. In a middle position, there is cargo space on either front or rear ends of the rear seat 30 to accommodate cargo in these areas, such as a table T.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A rear seat assembly for a truck having a passenger compartment, wherein the passenger compartment includes a floor and a rear wall, said rear seat assembly comprising:
    a seat back pivotally adjustable between a generally upright seating position and a folded flat position;
    a seat cushion movable vertically between a seating position spaced apart from the floor of the vehicle and a stowed position adjacent the floor of the vehicle, the seat cushion being movable between the seating position and the stowed position in response to movement of the seat back between the generally upright seating position and the folded flat position; and
    a track mechanism having a lower track fixedly secured to the floor and an upper track slidably engaged with the lower track to allow selective generally horizontal adjustment of the rear seat assembly.

2. A rear seat assembly as set forth in claim 1, wherein the seat cushion remains generally horizontal during displacement between the seating position and the stowed position.

3. A rear seat assembly as set forth in claim 1 including a recliner mechanism that allows selective angular adjustment of the seat back about a pivot axis relative to the seat cushion between a plurality of seating positions and the folded flat position, the seat cushion being movable between the seating position and the stowed position in response to movement of the seat back between the plurality of seating positions and the folded flat position.

4. A rear seat assembly as set forth in claim 1 including an adjuster mechanism operatively coupled between the seat back and seat cushion to provide automatic movement of the seat cushion between the seating and stowed positions in response to adjustment of the seat back between the upright seating and folded flat positions, respectively, the adjuster mechanism having a four-bar linkage.

5. A rear seat assembly as set forth in claim 4, wherein the seat back is movable about a first pivot axis between the seating and folded flat positions, the seat back forming a part of the four-bar linkage.

6. A rear seat assembly as set forth in claim 5, wherein the seat cushion is pivotally coupled to the seat back at a second pivot axis spaced apart and generally parallel with the first pivot axis.

7. A rear seat assembly as set forth in claim 1, wherein the rear seat assembly may be generally horizontally adjusted while the seat back is in the folded flat position and the seat cushion is in the stowed position.

8. A rear seat assembly as set forth in claim 7 wherein the rear seat assembly is adjustable between a frill rear position, wherein a rear end of the seat cushion is adjacent the rear wall, and a full forward position, wherein the rear end of the seat cushion is spaced apart from the rear wall.

9. A rear seat assembly for a truck having a passenger compartment, wherein the passenger compartment includes a floor and a rear wall, said rear seat assembly comprising:
  a seat back pivotally adjustable between a generally upright seating position and a folded flat position;
  a seat cushion pivotally coupled to the seat back;
  an adjuster mechanism operatively coupled between the seat back and seat cushion to cause generally vertical displacement of the seat cushion between a seating position spaced apart from the floor of the vehicle and a stowed position spaced below the seating position in response to adjustment of the seat back between the upright seating and folded flat positions, the adjuster mechanism including an at least four-bar linkage, wherein the seat back forms a part of the at least four-bar linkage; and
  a track mechanism having a lower track fixedly secured to the floor and an upper track slidably engaged with the lower track to allow selective generally horizontal adjustment of the rear seat assembly.

10. A rear seat assembly as set forth in claim 9, wherein the four-bar linkage includes a first link pivotally coupled to the track assembly and the seat cushion.

11. A rear seat assembly as set forth in claim 9, wherein the seat cushion remains generally horizontal during displacement between the seating position and the stowed position.

12. A rear seat assembly as set forth in claim 9 including a track mechanism having a lower track fixedly secured to the floor and an upper track slidably engaged with the lower track to allow selective generally horizontal adjustment of the rear seat assembly.

13. A rear seat assembly as set forth in claim 12, wherein the rear seat assembly can be generally horizontally adjusted while the seat back is in the folded flat position and the seat cushion is in the stowed position.

14. A rear seat assembly as set forth in claim 12, wherein the four-bar linkage is coupled to the upper track for movement therewith relative to the lower track.

15. A rear seat assembly as set forth in claim 12 wherein the rear seat assembly is adjustable between a full rear position, wherein a rear end of the seat cushion is adjacent the rear wall, and a fill forward position, wherein the rear end of the seat cushion is spaced apart from the rear wall.

16. A rear seat assembly as set forth in claim 9 including a lock mechanism for selectively locking the seat cushion in the seating position.

* * * * *

UNITED STATES PATENT AND TRADEMARK OFFICE
CERTIFICATE OF CORRECTION

PATENT NO. : 7,484,786 B2
APPLICATION NO. : 11/555481
DATED : February 3, 2009
INVENTOR(S) : Todd Rupert Muck et al.

It is certified that error appears in the above-identified patent and that said Letters Patent is hereby corrected as shown below:

Column 2, line 66, replace "frill" with --full--
Column 5, line 10, replace "frill" with --full--
Column 6, line 24, replace "fill" with --full--

Signed and Sealed this

Twenty-first Day of April, 2009

JOHN DOLL
*Acting Director of the United States Patent and Trademark Office*